United States Patent
Conrad (10) Patent No.: US 10,355,467 B1
(45) Date of Patent: Jul. 16, 2019

(54) SYSTEMS AND METHODS FOR ATTACHMENT OF MULTIPLE UTILITY CONDUCTORS USING A MEGAVANG

(71) Applicant: PPL Corporation, Allentown, PA (US)

(72) Inventor: James Conrad, Allentown, PA (US)

(73) Assignee: PPL Corporation, Allentown, PA (US)

( * ) Notice: Subject to any disclaimer, the term of this patent is extended or adjusted under 35 U.S.C. 154(b) by 0 days.

(21) Appl. No.: 15/857,116

(22) Filed: Dec. 28, 2017

(51) Int. Cl.
*H02G 7/05* (2006.01)
*H02G 7/20* (2006.01)
*H02G 1/04* (2006.01)

(52) U.S. Cl.
CPC ............ *H02G 7/205* (2013.01); *H02G 1/04* (2013.01); *H02G 7/05* (2013.01)

(58) Field of Classification Search
CPC ............ H02G 7/205; H02G 1/04; H02G 7/05; H02G 7/00; H02G 7/02; H02G 7/06; H02G 7/12; H02G 7/20; H02G 15/00
USPC ....... 174/44, 40 R, 43, 45 R, 45 TD, 40 CC, 174/40 TD, 135, 146; 248/56, 68.1
See application file for complete search history.

(56) References Cited

U.S. PATENT DOCUMENTS

| | | | | | |
|---|---|---|---|---|---|
| 3,499,973 | A | * | 3/1970 | Barnes | H02G 7/20 174/149 R |
| 4,025,824 | A | * | 5/1977 | Cheatham | H02B 5/02 174/45 R |
| 5,981,879 | A | * | 11/1999 | Blanding | H01B 17/16 174/168 |
| 6,143,980 | A | * | 11/2000 | Blanding | H02G 7/12 174/40 CC |
| 6,347,488 | B1 | * | 2/2002 | Koye | E04H 12/24 174/146 |
| 6,667,442 | B1 | * | 12/2003 | Hilligoss | H02G 7/053 174/174 |
| 7,323,636 | B1 | * | 1/2008 | Borges | H02G 7/12 174/41 |
| 7,692,100 | B2 | * | 4/2010 | Boisclair | H02G 7/12 174/146 |
| 8,907,222 | B2 | * | 12/2014 | Stransky | H02G 3/0418 174/137 R |
| 8,952,251 | B2 | * | 2/2015 | Fulk | H02G 7/20 174/45 TD |

* cited by examiner

*Primary Examiner* — Angel R Estrada
(74) *Attorney, Agent, or Firm* — Haynes and Boone, LLP

(57) ABSTRACT

A system for attaching communication utility lines to a pole includes a body portion, the body portion including a plurality of attachment apertures. The system further includes a plurality of vangs located along the body portion, the vangs spaced apart and each including an aperture for receiving a communication utility line.

12 Claims, 6 Drawing Sheets

SYSTEMS AND METHODS FOR ATTACHMENT OF MULTIPLE UTILITY CONDUCTORS USING A MEGAVANG

BACKGROUND

Communication utility conductors are often attached to steel electric utility distribution and transmission poles via the use of a yang. The specification regarding placement of the yang on the steel poles must comply with applicable National Electrical Safety Code (NESC) and National Electrical Code (NEC) standards, most specifically governing clearances between conductors at the point of attachment.

In certain cases, it is necessary for an electric utility to allow multiple communication utilities to attach conductors to a singular steel distribution or transmission pole. In these cases, multiple singular vangs must be attached to the pole to allow multiple connection points to accommodate the attachments of multiple communication utilities. Each yang is typically attached to the pole via two through-bolts via through-holes, which must be drilled through the steel pole.

It would be desirable to provide a yang system that would allow for the attachment of multiple vangs to pole, while reducing the number of bolts and efforts of the installer. It would be desirable for this system to meet applicable safety and other guidelines.

BRIEF SUMMARY

In one embodiment, a system for attaching communication utility lines to a pole includes a body portion, the body portion including a plurality of attachment apertures. The system further includes a plurality of vangs located along the body portion, the vangs spaced apart and each including an aperture for receiving a communication utility line. In one alternative, the plurality of attachment apertures includes three apertures. In another alternative, the three apertures include a middle aperture, a top aperture, and a bottom aperture and the apertures are aligned along a line running longitudinally along a central vertical axis of the body portion. Alternatively, the top aperture is circular and the middle and bottom aperture are oval shaped. Optionally, the body portion is formed from an approximately rectangular shaped material having narrow depth, wherein the body portion is bent along a plurality of vertical axes. In another alternative, a first and second bend of the body portion along the plurality of vertical axes form a ninety degree inner angle, and the first and second bend of the body portion are proximate to the central axis of the body portion. Optionally, a third and fourth bend of the body portion along the plurality of vertical axes form a sixty degree inner angle and are further form the central axis that the first and second bend. Alternatively, the plurality of vangs includes four vangs and the four vangs are spaced apart on the central vertical axis, a first yang of the four vangs a first distance from a second yang of the four vangs, the second yang the first distance from the first yang and a third yang, and the third yang the first distance from the second yang and a fourth yang. In another alternative, the plurality of attachment apertures includes three attachment apertures, a first attachment aperture of the three attachment apertures between the first and second yang, a second attachment aperture of the three attachment apertures between the second and third yang, and a third attachment aperture of the three attachment apertures between the third and fourth yang. Optionally, each of the three attachment apertures includes an attacher. Optionally, the bracket is composed of weathering steel.

In one embodiment, a utility pole for holding a plurality of communication utility lines includes a pole and a megavang. The megavang includes a body portion, the body portion including a plurality of attachment apertures and a plurality of vangs located along the body portion, the vangs spaced apart and each including an aperture for receiving a communication utility line. In one alternative, the plurality of attachment apertures include three apertures and the three apertures include a middle aperture, a top aperture, and a bottom aperture and the apertures are aligned along a line running longitudinally along a central vertical axis of the body portion. In another alternative, the top aperture is circular and the middle and bottom aperture are oval shaped. Alternatively, the body portion is formed from an approximately rectangular shaped material having narrow depth, wherein the body portion is bent along a plurality of vertical axes and a first and second bend of the body portion along the plurality of vertical axes form a ninety degree inner angle, and the first and second bend of the body portion are proximate to the central axis of the body portion and a third and fourth bend of the body portion along the plurality of vertical axes form a sixty degree inner angle and are further form the central axis that the first and second bend. Optionally, the plurality of vangs includes four vangs and the fours vangs are spaced apart on the central vertical axis, a first yang of the four vangs a first distance from a second yang of the four vangs, the second yang the first distance from the first yang and a third yang, and the third yang the first distance from the second yang and a fourth yang. Alternatively, the plurality of attachment apertures includes three attachment apertures, a first attachment aperture of the three attachment apertures between the first and second yang, a second attachment aperture of the three attachment apertures between the second and third yang, and a third attachment aperture of the three attachment apertures between the third and fourth yang. Optionally, each of the three attachment apertures includes an attacher. In another alternative, the bracket is composed of weathering steel and the utility pole is a steel pole.

In one embodiment a method of attaching a plurality of communication lines to a pole includes providing a megavang. The megavang includes a body portion, the body portion including a plurality of attachment apertures. The megavang further includes a plurality of vangs located along the body portion, the vangs spaced apart and each including an aperture for receiving a communication utility line. The method further includes attaching the megavang via a plurality of attachers to the pole and running the plurality of communication lines through the plurality of vangs.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure.

DETAILED DESCRIPTION

Certain terminology is used herein for convenience only and is not to be taken as a limitation on the embodiments of the systems and methods for attachment of multiple utility conductors using a megavang. Embodiments are generally described as megavangs herein. In the drawings, the same reference letters are employed for designating the same elements throughout the several figures.

The disclosure provides a novel apparatus for connecting multiple communication conductors to a single steel electric utility distribution or transmission pole. More specifically, the disclosure provides a novel apparatus through a single piece of attachment hardware that complies with the above mentioned NESC and NEC standards for multiple communication conductors, while minimizing the number of through-holes that must be drilled through the steel pole to maintain the structural integrity of the pole. The drilling of many holes into a steel pole may impact its structural stability and may take the operator/work more time on the job.

The disclosure provides the design and specification for a megavang, a singular piece of hardware that, through attachment to a steel electric distribution or transmission pole, provides an attachment point for up to four communication utility conductors.

In some embodiments, the megavang consists of a curved bracket with four vangs that allow for attachment of communication utility conductors. The spacing between each of the vangs is designed to comply with NESC and NEC standards for communication utility conductor clearances. The megavang is designed to be attached to an electric utility distribution or transmission steel pole utilizing three through-bolts via three pre-drilled bolt holes, which may be drilled as through-holes on the steel pole for attachment.

In many embodiments, the megavang is constructed entirely of weathered steel, which is bent to conform to the necessary pole profile. The dimensions of the megavang including thickness, width, inner radius, length, leg length, and leg angle are based on strength calculations of the moment of the megavang, which allows for a maximum of four communication utility attachments. In alternative embodiments, multiple vangs may be added to the megavang according to the same or similar arrangement described herein.

In many embodiments, the apparatus is made up of two fundamental types of items, though it is manufactured as a singular device. For purposes of description only, the items will be described individually in order to present the best understanding of embodiments of the megavang. The first item is referred to as a bracket and second item is referred to as a yang. As shown in many embodiments, the megavang includes a bracket and multiple vangs. In many configurations, four vangs are included.

Figure 1:
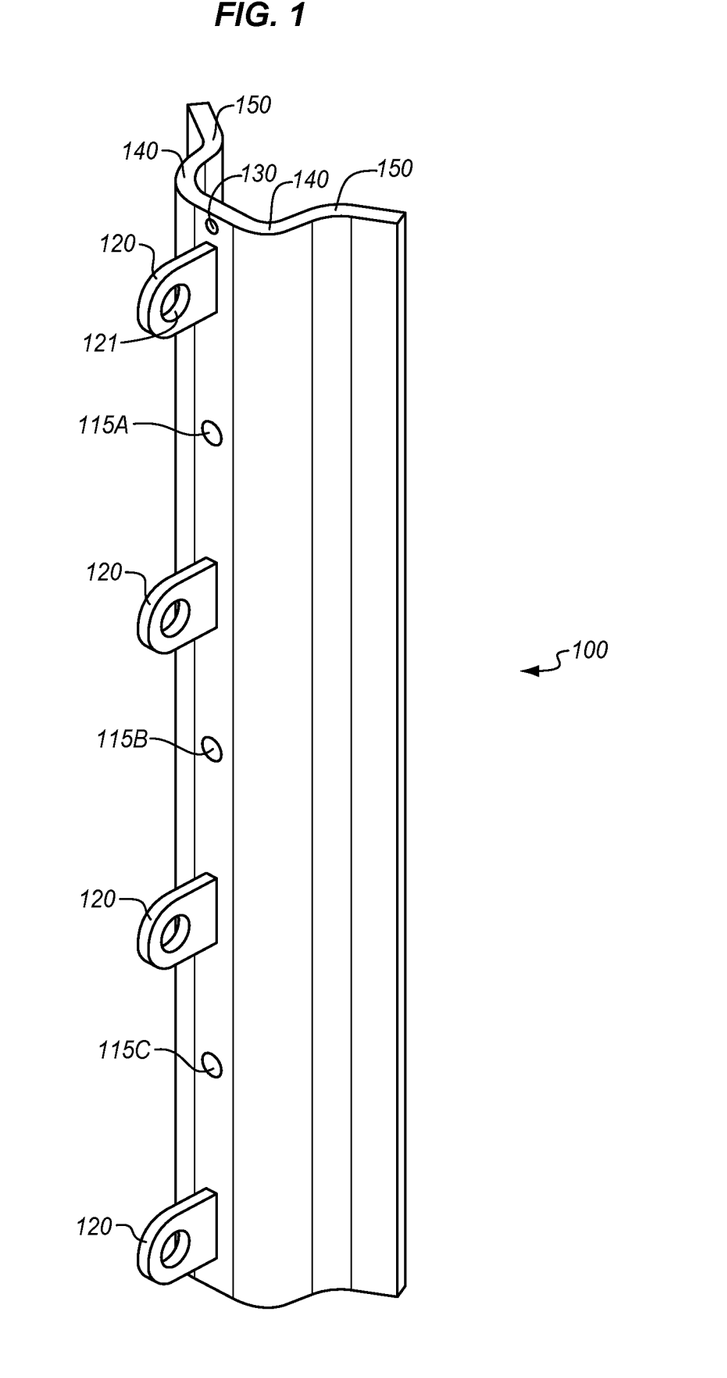
FIG. 1 shows a perspective view of one embodiment of a megavang.

In FIG. 1, one embodiment of a megavang is shown. Megavang 100 includes a body portion 110 also referred to as a bracket. Body portion 110 includes a plurality of attachment apertures 115a-c. Attached to body portion 110 is a plurality of vangs 120. The vangs 120 and apertures 115a-c are generally aligned along central axis 130. Additionally visible are bends along vertical axes 140 and bends along vertical axes 150. These bends provide for mounting of the body portion 110 against a pole. Generally, body portion 110 may be originally a rectangular piece of material that is subsequently bent at axes 140 and axes 150. In many embodiments, vangs 120 are created separately and welded to body portion 110. These are merely exemplary construction techniques however, and the megavang 100 may be created according to a variety of techniques. Generally, vangs 120 include apertures 121 for the insertion of a wire, the wire typically being a utility attachment. Not shown are connectors (attachers) that may be fit into apertures 115a-c. These attachers may be bolts or other connection devices that provide for the attachment of the megavang 100 to a pole.

In many configurations, bracket 110 is made of weathering steel. Prior to the bending process, the bracket 110 is rectangular and measures 15.5625 inches wide, 51 inches tall, and 0.75 inches thick. The bracket 110 has three through-holes (apertures 115a-c) drilled through it. The first through-hole (aperture 115a) is circular and has a diameter of 0.0625 inches. The first through-hole is placed 10.5 inches from the top of the bracket to the center of the through-hole, and 7.78125 inches from either side of the bracket to the center of the through-hole. The second through-hole (aperture 115b) is a slotted hole, oval-shaped with dimensions of 0.0625 inches wide and 0.3125 inches tall. The second through-hole is placed 25.5 inches from the top of the bracket to the center of the through-hole, and 7.8125 inches from either side of the bracket to the center of the through-hole. The third through-hole (aperture 115c) is a slotted hole, oval-shaped with dimensions of 0.0625 inches wide and 0.3125 inches tall. The third through-hole is placed 40.5 inches from the top of the bracket to the center of the through-hole, and 7.8125 inches from either side of the bracket to the center of the through-hole. The second and third apertures/through-holes are oval shaped in order to accommodate flexible placement of the second and third attacher or bolt used to connect the megavang to a pole.

Figure 2A:
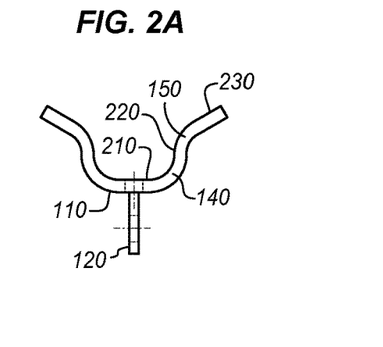
FIG. 2A shows a top view of the megavang of FIG. 1.
Figure 2B:
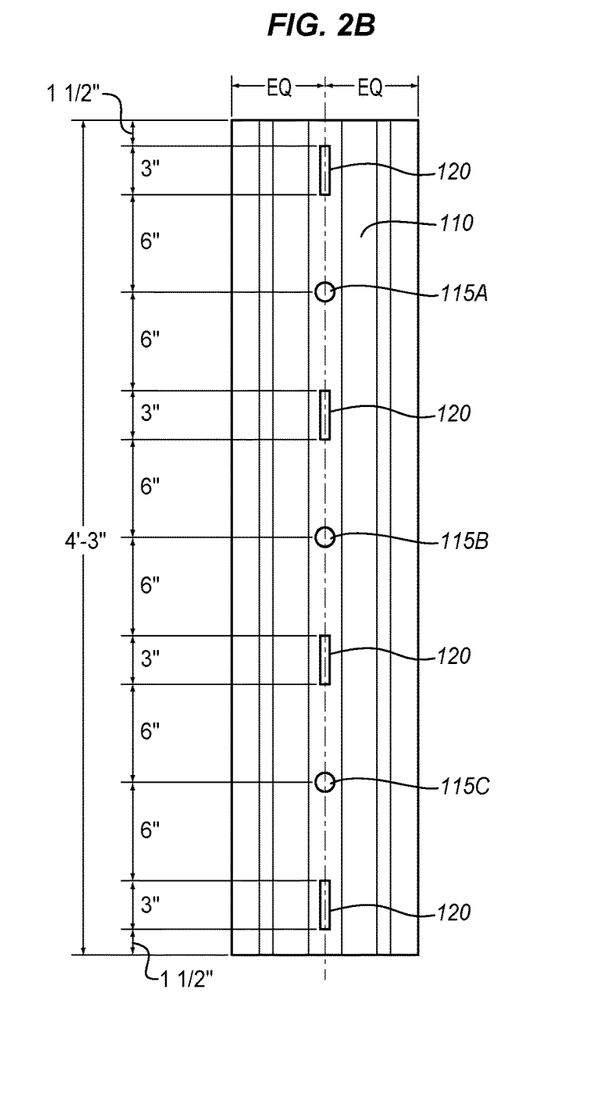
FIG. 2B shows a scaled front view of the megavang of FIG. 1.

FIG. 2A shows a top view of the megavang of FIG. 1. In this view the bends at axes 140 and axes 150 are visible. As shown in this figure, the bend at axes 140 creates an approximately perpendicular arrangement between portion 210 and portion 220 of body portion 110. Additionally, an approximately 60 degree angle is created between body portion 220 and body portion 230. FIG. 2B shows a scaled front view of the megavang of FIG. 1. Here the positioning of the vangs 120 on body portion 110 is visible as well as the positioning and measurements of apertures 115a-c.

Figure 3:
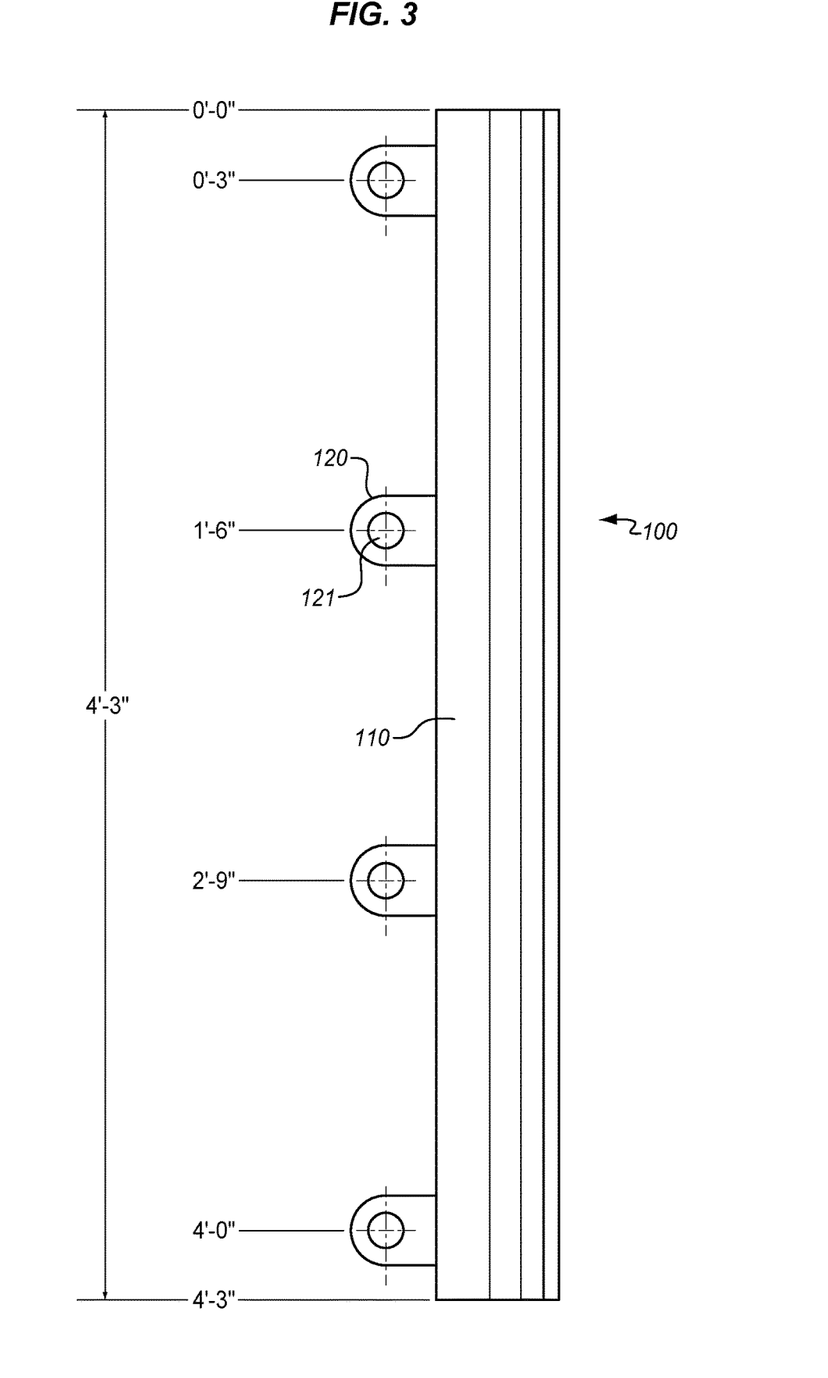
FIG. 3 shows a side view of the megavang of FIG. 1.

FIG. 3 shows a side view of the megavang of FIG. 1. Here the sizes of apertures 121 and as vangs 120 are visible on body portion 110. The size and configuration of megavang 100 are also shown.

Figure 4A:
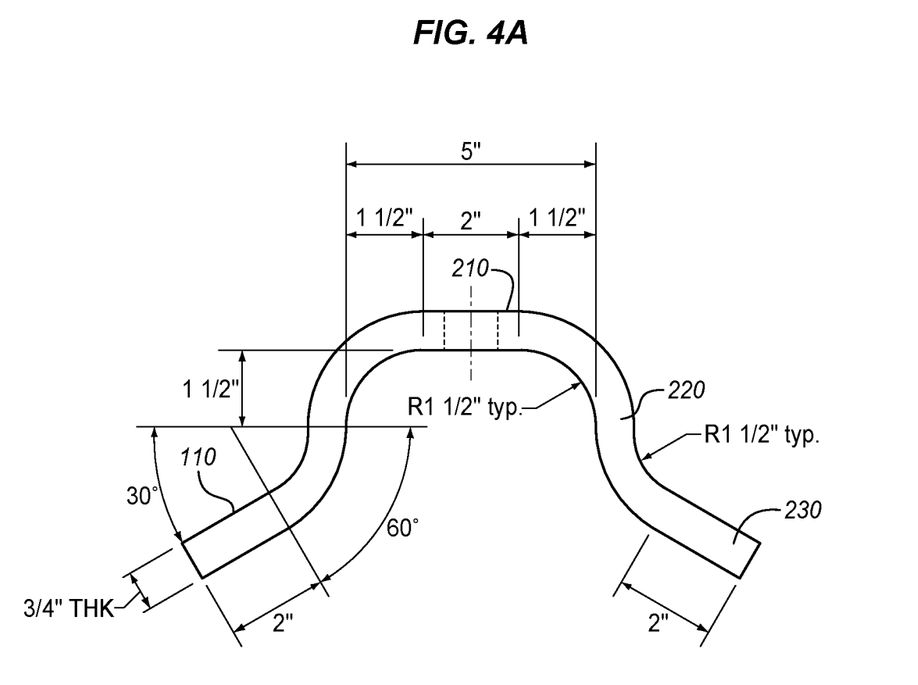
FIG. 4A shows a top view of the bent apparatus bracket without vangs.
Figure 4B:
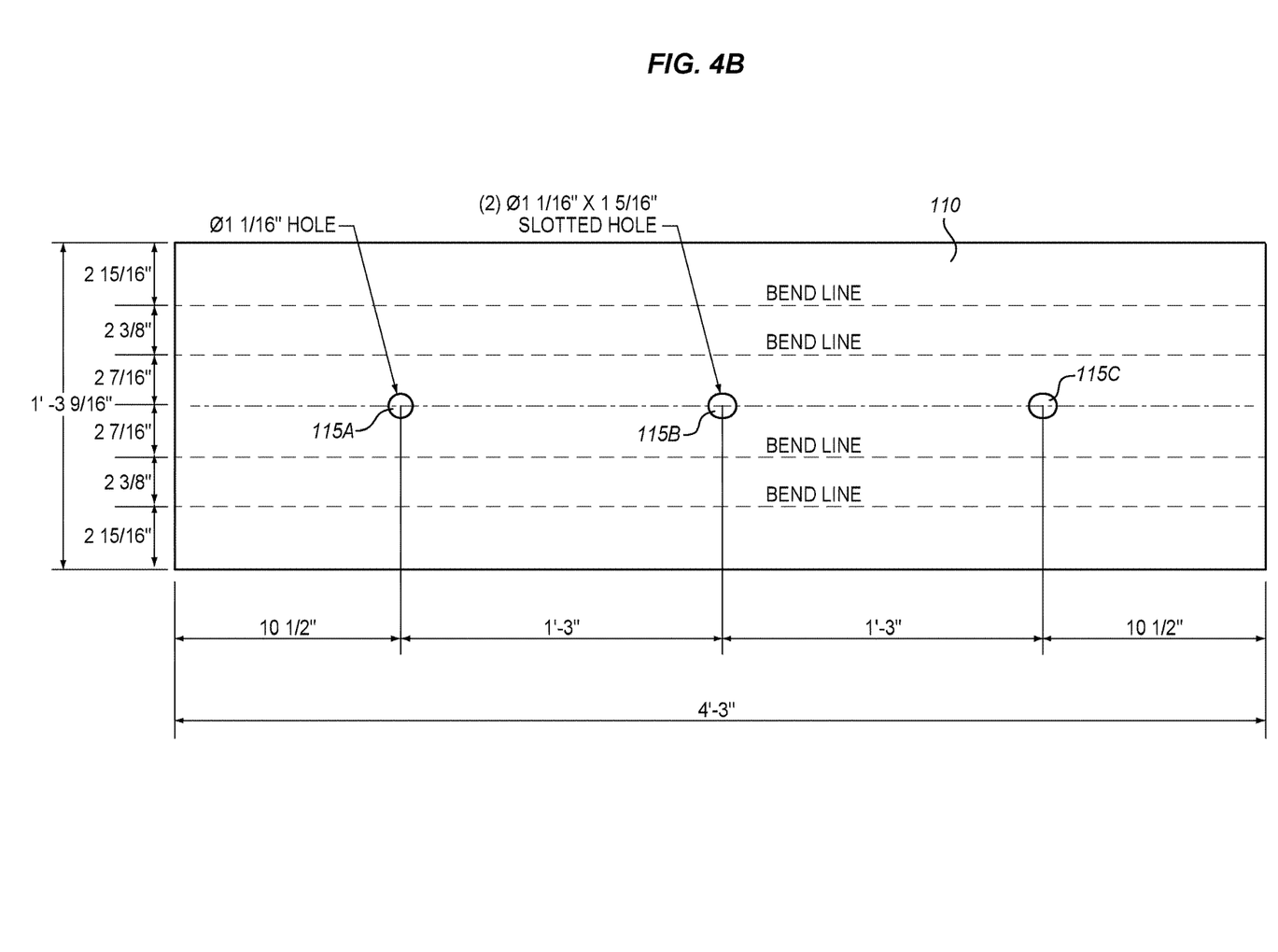
FIG. 4B shows a scaled back view of the unbent apparatus bracket without vangs, illustrating the bracket bending process described herein.

FIG. 4A shows a top view of the bent apparatus bracket 110 without vangs. The lengths of various portions are visible as well as the angular arrangement of portions of the bracket 110. FIG. 4B shows a scaled back view of the unbent apparatus bracket without vangs, illustrating the bracket bending process described herein.

Figure 5:
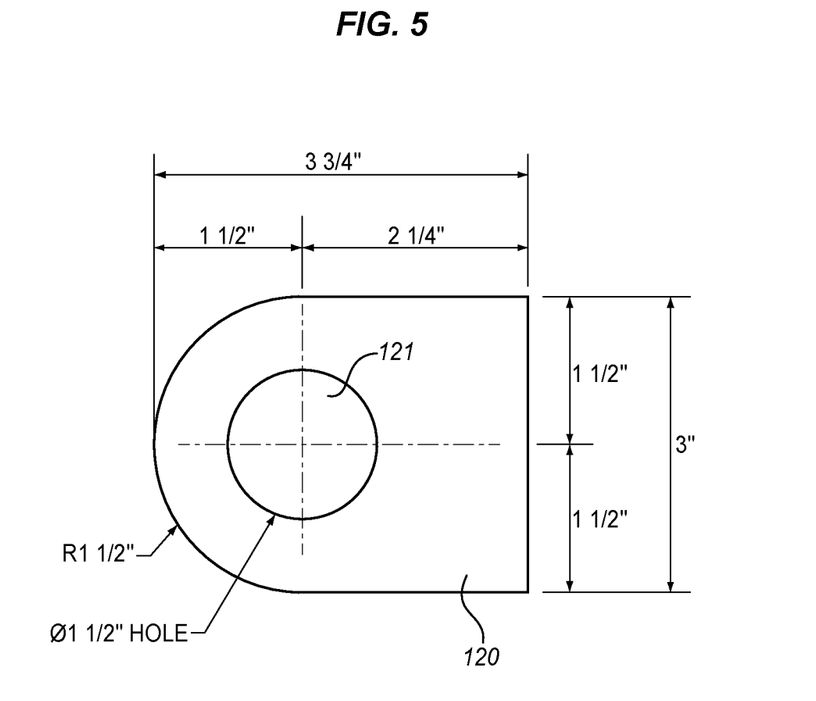
FIG. 5 shows a detailed side view of an embodiment of a singular yang used in the megavang of FIG. 1.

FIG. 5 shows a detailed side view of an embodiment of a singular yang 120 having an aperture 121 used in the megavang of FIG. 1.

The bending process is done on the vertical axis of the bracket 110, maintaining the height of the final bracket at 51 inches as shown in FIG. 4. The bending process of the bracket 110 is performed symmetrically to achieve a symmetrical bracket. The bending process for one side of the bracket 110 is described below, and is repeated for the other side of the bracket 110 to achieve a symmetrical bracket. All measurements used to describe the bending process are in reference to the width of the bracket, as it is bent along the vertical axis.

Bend 1 along vertical axes 140 is made to allow 1 inch from the center of the bracket on the inside of the bracket to remain flat at an interior angle of zero degrees. The bend is made such that a 90 degree interior angle is achieved on the inside of the bracket 2.5 inches from the center of the bracket. The length of the bent portion is 1.5 inches, measuring from the inside of the bracket with an interior angle of zero degrees to the inside of the bracket with an interior angle of 90 degrees.

Bend 2 along axes 150 is made to allow for the leg of the bracket that touches the pole to have an interior angle of 60 degrees. The resulting leg is approximately two inches long.

Each of the four vangs 120 is placed along the vertical axis of the bracket 110, separated equally by 15 inches from center-hole to center-hole of each of the vangs. The first yang is placed 3 inches from the top of the bracket to the center hole of the first yang. The second yang is placed 18 inches from the top of the bracket to the center hole of the second yang. The third yang is placed 33 inches from the top of the bracket to the center hole of the third yang. The fourth yang is placed 48 inches from the top of the bracket to the center hole of the third yang. In alternative embodiments, additional vangs may be added, 15 inches from the previous yang. Additionally, additional through-holes will be added approximately 7.5 inches from the previous yang. In an alternative embodiment, one of the vangs and through-holes may be eliminated, resulting in only 3 vangs and two through-holes.

Each yang 120 is 0.5 inches wide, 3 inches tall, and 3.75 inches deep. As shown in the side view of the yang 120 in FIG. 5, the yang is a rounded piece of weathering steel with a circular through-hole. All measurements used to describe the yang below are in relation to the height and depth of the yang. The width of the yang remains a constant 0.5 inches.

The through-hole (aperture 121) of the yang is circular with a diameter of 0.5 inches. The through-hole is placed 1.5 inches from the top of the yang to the center of the through-hole, and 1.5 inches from the front of the yang to the center of the through-hole. The front of the yang 120 is a semicircle, with a diameter of 1.5 inches from the center of the through-hole to the edge of the yang. The semicircle begins and ends at the center depth of the through-hole, completing 180 degrees. The back of the yang is rectangular, measuring 2.25 inches in depth from the center of the through-hole to the deepest edge of the yang, and 3 inches tall.

The resultant apparatus is referred to as a megavang 100, consisting of four individual vangs placed 15 inches apart on a bracket that measures 51 inches tall with three through-holes for attachment to a steel pole, as most easily seen in FIG. 1. When installed on an electric distribution or transmission steel pole, it offers attachments for up to four communication utility conductors.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A system for attaching communication utility lines to a pole, the system comprising:
    a body portion, the body portion including a plurality of attachment apertures; and
    a plurality of vangs located along the body portion, the vangs spaced apart and each including an aperture for receiving a communication utility line, wherein the plurality of attachment apertures includes three apertures, the three apertures include a middle aperture, a top aperture, and a bottom aperture and the apertures are aligned along a line running longitudinally along a central vertical axis of the body portion, the top aperture is circular and the middle and bottom aperture are oval shaped, and the body portion is formed from an approximately rectangular shaped material having narrow depth, wherein the body portion is bent along a plurality of vertical axes.

2. The system of claim 1, wherein a first and second bend of the body portion along the plurality of vertical axes form a ninety degree inner angle, and the first and second bend of the body portion are proximate to the central axis of the body portion.

3. The system of claim 2, wherein a third and fourth bend of the body portion along the plurality of vertical axes form a sixty degree inner angle and are further form the central axis that the first and second bend.

4. The system of claim 1, wherein the bracket is composed of weathering steel.

5. A system for attaching communication utility lines to a pole, the system comprising:
    a body portion, the body portion including a plurality of attachment apertures; and
    a plurality of vangs located along the body portion, the vangs spaced apart and each including an aperture for receiving a communication utility line, wherein the plurality of vangs includes four vangs and the fours vangs are spaced apart on the central vertical axis, a first yang of the four vangs a first distance from a second yang of the four vangs, the second yang the first distance from the first yang and a third yang, and the third yang the first distance from the second yang and a fourth yang.

6. The system of claim 5, wherein the plurality of attachment apertures includes three attachment apertures, a first attachment aperture of the three attachment apertures between the first and second yang, a second attachment aperture of the three attachment apertures between the second and third yang, and a third attachment aperture of the three attachment apertures between the third and fourth yang.

7. The system of claim 6, wherein each of the three attachment apertures includes an attacher.

8. A utility pole for holding a plurality of communication utility lines, comprising:
    a pole;
    a megavang, the megavang including:
    a body portion, the body portion including a plurality of attachment apertures; and a plurality of vangs located along the body portion, the vangs spaced apart and each including an aperture for receiving a communication utility line, wherein the plurality of attachment apertures includes three apertures and the three apertures include a middle aperture, a top aperture, and a bottom aperture and the apertures are aligned along a line running longitudinally along a central vertical axis of the body portion, the top aperture is circular and the middle and bottom aperture are oval shaped, and the body portion is formed from an approximately rectangular shaped material having narrow depth, wherein the body portion is bent along a plurality of vertical axes and a first and second bend of the body portion along the plurality of vertical axes form a ninety degree inner angle, and the first and second bend of the body portion are proximate to the central axis of the body portion and a third and fourth bend of the body portion along the plurality of vertical axes form a sixty degree inner angle and are further form the central axis that the first and second bend.

9. The utility pole of claim 8, wherein the plurality of vangs includes four vangs and the fours vangs are spaced apart on the central vertical axis, a first yang of the four vangs a first distance from a second yang of the four vangs, the second yang the first distance from the first yang and a third yang, and the third yang the first distance from the second yang and a fourth yang.

10. The utility pole of claim 9, wherein the plurality of attachment apertures includes three attachment apertures, a first attachment aperture of the three attachment apertures between the first and second yang, a second attachment aperture of the three attachment apertures between the second and third yang, and a third attachment aperture of the three attachment apertures between the third and fourth yang.

11. The utility pole of claim 10, wherein each of the three attachment apertures includes an attacher.

12. The utility pole of claim 11, wherein the bracket is composed of weathering steel and the utility pole is a steel pole.

\* \* \* \* \*

UNITED STATES PATENT AND TRADEMARK OFFICE
CERTIFICATE OF CORRECTION

PATENT NO. : 10,355,467 B1
APPLICATION NO. : 15/857116
DATED : July 16, 2019
INVENTOR(S) : James Conrad, Bashar Jarrah and Kristie Rippke It is certified that error appears in the above-identified patent and that said Letters Patent is hereby corrected as shown below:

On the Title Page

Item (12), delete "Conrad" and insert --Conrad et al.--.

Item (72), please insert the newly added inventors:

--Bashar Jarrah
Whitehall, Pennsylvania
US

Kristie Rippke
Breinigsville, Pennsylvania
US--.

Signed and Sealed this
Twenty-fourth Day of October, 2023

Katherine Kelly Vidal
*Director of the United States Patent and Trademark Office*